United States Patent [19]

Bolger

[11] 4,061,050

[45] Dec. 6, 1977

[54] COMPENSATING MECHANISM

[76] Inventor: Joseph Earl Bolger, Summer St., Barre, Mass. 01005

[21] Appl. No.: 722,022

[22] Filed: Sept. 10, 1976

[51] Int. Cl.² .......................... G05G 1/00; B62D 3/00
[52] U.S. Cl. ..................................... 74/469; 180/33 B
[58] Field of Search ....................... 74/469; 180/33 B

[56] References Cited

U.S. PATENT DOCUMENTS

| 3,263,516 | 8/1966 | Chisholm | 74/469 |
| 3,538,781 | 11/1970 | Ovchinnikov et al. | 74/469 |

Primary Examiner—Leonard H. Gerin

[57] ABSTRACT

In a two-wheel vehicle, a compensating mechanism allowing the mounting of a driving sprocket and a cantilevered driven sprocket as to each other such that the driven sprocket is held at a desired degree of constant tensioned relationship with respect to the driving sprocket during normal operation and/or moments of subnormal operation wherein the suspension is momentarily directed vertically upwardly or downwardly due to uneven terrain or other circumstance.

3 Claims, 5 Drawing Figures

COMPENSATING MECHANISM

The invention concerns improvements in a system for controlling the tautness in the chain linkage entrained between the engine and driving wheel of a two-wheeled vehicle.

Conventionally, a swing arm is pivotally mounted at its forward end to the vehicle frame and at its reaward end to the rear wheel axle wherefor the rear wheel is thus cantilevered, allowing for its rise and fall through a considerable range of vertical movement above and below a normal straight-line or center-line disposition of engine counter shaft, swing arm forward pivot, and rear wheel axle with the driving chain being entrained around its sprockets and extending between the engine counter shaft and the rear wheel axle.

The swing arm being disposed aft of the engine counter shaft, it follows that the arc generated from the forward swing arm pivot on the frame and passing through the rear wheel axle is representative of the sweep of the rear wheel as it is forced vertically in either upward or downward direction from its normal disposition. This arc will theoretically coincide with the arc which is determined by the forward sprocket center and passes through the rearward sprocket center, the same being representative of the vertical sweep of the rearward sprocket as the rear wheel is driven vertically upwardly and downwardly. In truth, the coincidence has been only at one point of intersection, i.e. when the engine counter shaft and forward swing arm pivot and rear wheel axle have been in that aforementioned horizontal alignment. This has been so for the obvious reason that the two generated arcs are not concentric, having different centers and different diameters. It is this very fact of geometry which gives rise to the problem which this invention seeks to solve.

This invention aims to provide the means by which the two generated arcs are in perfect coincidence at all times.

The invention arises out of a crying need for an inexpensive, simplified, lightweight mechanism which will facilitate usage in any kind of travel, but particularly in races or travel over rough terrain or country having no well defined trails, such types of usage having become increasingly popular in recent years.

Accordingly, the main objective of the invention is to provide a mechanism which can be readily installed and which will offer a vehicle construction which possesses sufficient ruggedness and durability for any kind of usage.

Herewith, as the rear wheel is driven in a vertical plane about its pivot as determined by the swing arm, a compensating lever pivots responsively and aids in insuring a constant chain tension by taking up the slack that would occur in one of the runs of the drive chain as the rear wheel might rise or fall through that considerable range of movement experienced in operational use.

The device substantially reduces shock loading in excess of the horsepower transmitted load and allows a greatly increased chain life by virtue of a constant relative tension as the sprocket centers never change their positional relationship as to each other when the rear wheel swings through any arc of vertical movement.

There is the salient advantage that the chain does not have to be pre-set in order to provide an adequacy of slack to compensate for the variations normally encountered in the operation of presently-available vehicles. Being so, with this inherent lack of slackness, it follows that the probability of a chain staying on its respective sprockets is greatly enhanced.

With conventional two-whelled vehicles, in the course of chain adjustment, it is normal to load the machine. To achieve this, the rear suspension is usually compressed until the chain is judged, usually by a hand feel, to be at its tightest. The chain has its greatest degree of slack at both extremes, the lower and the upper, of suspension travel, a slack which is abruptly taken up when the suspension system reacts suddenly to an encountered obstacle. The slack situation again comes into play when the suspension system carries the swing-arm and rear wheel vertically beyond the normal operating straight-line situation toward a mode of full compression.

This invention provides a mechanism by which the rear wheel is cantilevered to allow its rise and fall through a considerable range of movement but without changing the sprocket-to-sprocket distance, sometimes called the band distance. This is effected by a pair of cooperant pivotable links which unite the components, their centers of movement being so arranged that the rear wheel axle rises and falls in the arc of a circle which is ever concentric with the engine driving shaft. Ergo the taut chain is ever taut.

Assume that, as the conventional vehicle of today is driven along a roadway, the upper run or strand of the driving chain is taut and under load. In the course of such operation, as an uneven roadway or obstacle thereon may be encountered so as adversely to effect the horizontal or linear rear wheel movement, the rear wheel is caused to swing vertically in an arc above and/or below the theoretical center line, all according to the degrees of the bounce. The normal effect is obviously to alter the center-to-center relationship of the forward and rearward sprockets. This is the situation normal to today's vehicles and which this invention seeks to cure.

Further as to this norm, it has to be appreciated that the rear wheel has to accelerate or decelerate slightly as the swing-arm sweeps through its vertically-disposed arc, to the detriment of the chain life incidentally as it runs against the rear wheel rotation in one mode and runs with it in the opposite mode. In other words, the upper chain run has to slightly lengthen and/or to slightly shorten according to the suspension movement. This action takes place against the wheel resistance, at least through half of the totality of the arc travel if not through all of it.

With special concern as to usage where, upon landing from a bump, the suspension is generally compressed to its limit, a further comment obtains. If the operator happens to have landed slightly at an angle from the true vertical, or if his machine happens to be cocked slightly at an angle from a straight line (either situation being common in such instance), the frame may be observed to flex to a considerable degree meaning that the wheels are not disposed in their proper relationship with reference to the balance of the vehicle. The rear wheel may lay over to one side with, obviously, the rear wheel sprocket no longer being aligned with the transmission sprocket. Worse, at that precise moment when the suspension is totally compressed and the chain is most slack, the chain may be thrown so as to lock the wheel or engine and the operator may be injured.

Any chain slack, beyond the normal amount required to allow free running, must be taken up each time the throttle opens or closes. The upper run of course tightens as power is applied, and the lower run tightens as the throttle is closed and the rear wheel is in effect turning the engine.

Assume a climbing situation along a gradual hill and under a full throttle condition. The suspension system is compressed more than likely beyond the normal straight line situation, and the pull from the chain has the effect of trying to continue to pull the rear wheel upwardly, and this for the reason that the chain isn't swinging around the same pivot point as the swing arm. Ergo the further the suspension compresses, the greater this effect. That is, the over-center and under-center pull on the suspension is desirably cancelled out and the device of this invention is the cure for this problem.

In the case of a conventional machine, the manufacturer sets up his suspension system generally as a matter of compromise. He builds enough resistance into the system to resist its being entirely compressed as full engine power is used. This means that the suspension is much too stiff or harsh on the same terrain, if only a moderate degree of power is used. Ths suspension then only resists the terrain undulations being covered and the affect of the input of torque or engine power is minimized. Thus compromise. Assume that an operator is travelling down a bumpy hill, with his power completely off and his machine going excessively fast. The bottom run of the chain is taut as it is forced to drive the engine/gearbox unit and the suspension probably remains at full extension as the machine weight is concentrated on the front wheel and the power is not being applied. It follows that the braking load on the bottom run of the chain, as it trys to keep the engine/gearbox unit spinning at the rate dictated by the rear wheel speed, makes the suspension more stiff because the rear wheel is under center from the straight-line situation and the taut chain is trying to hold it under that center or straight line.

So long as overall suspension travel or height of vertical swing was in order of only 3 to 5 inches, this problem of slackening and tightening was not of major proportions and chain life was relatively long. However machines now commonly have as much as 10 inches of suspension travel and the chain cannot be kept on its sprockets without additional devices. There is the added problem of drive-line slop, as the chain is suddenly jerked tight in a power-off to power-on situation. In effect, the front sprocket is allowed to accelerate momentarily until the required chain slack is taken up. There follows a severe shock loading throughout the drive line, often leading to damaged transmissin gears, a stretching of the top run of the chain, and even a possible stressing of the frame as it tries to hold the components in line.

The chain slack problem has been observed to grow more serious as the suspension systems are given ever more travel from the usual order of 3 to 5 inches to the unusual order of 10 to 12 inches as operators seem to demand more and more of the vehicles in the area of capacity to tolerate operating extremes.

As aforesaid, the chain is allowed more free play or slack as the rear axle moves vertically above or below its normal operating line. And this leads, of course, to all manner of problems: the chain is destroyed as it is forced sideways, sprockets are often damaged, and the wheel may lock as the chain jams against some part of the machine. A further drawback to supplemental devices such as tensioners, rollers, and the like is that they normally hold the bottom run of the chain tight, by pressing upward at some point between the two sprockets. However, when shifting to a lower gear and using the engine for braking, the bottom run of the chain is loaded, and this loading easily overcomes the spring tension built into any tensioner. Thus, the top run of the chain is now hanging free, with no load and no tensioner to keep it taut. This often is the cause of the chain jumping the front sprocket, and there is really no way to properly tension both runs of the chain, ergo this invention.

Figure 1:
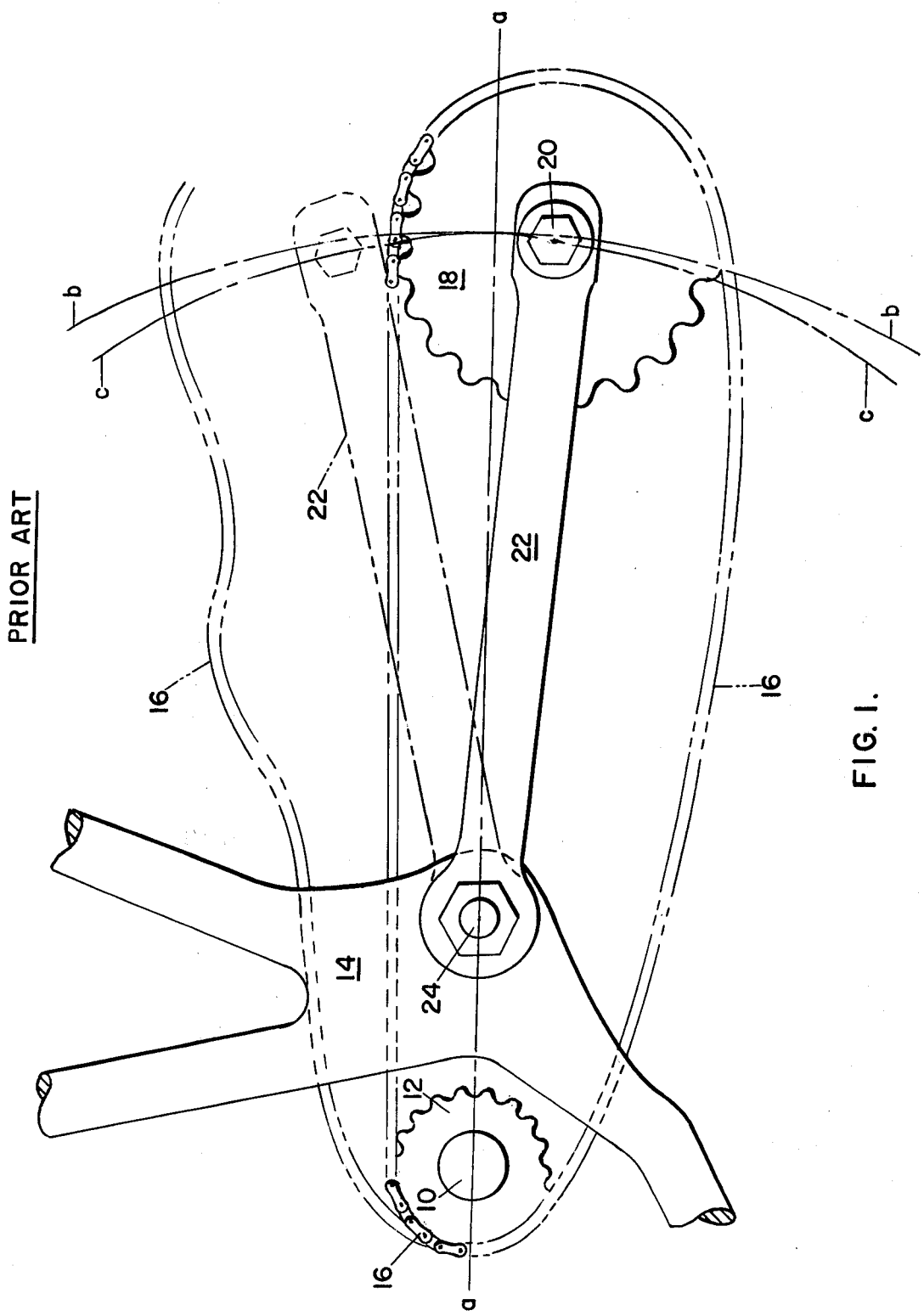
FIG. 1 is a fragmentary view of the usual motorcycle structure for purposes only of showing, in simplified schematic view, the gear train between the motor crankshaft and the rear (driving) wheel.
Figure 2:
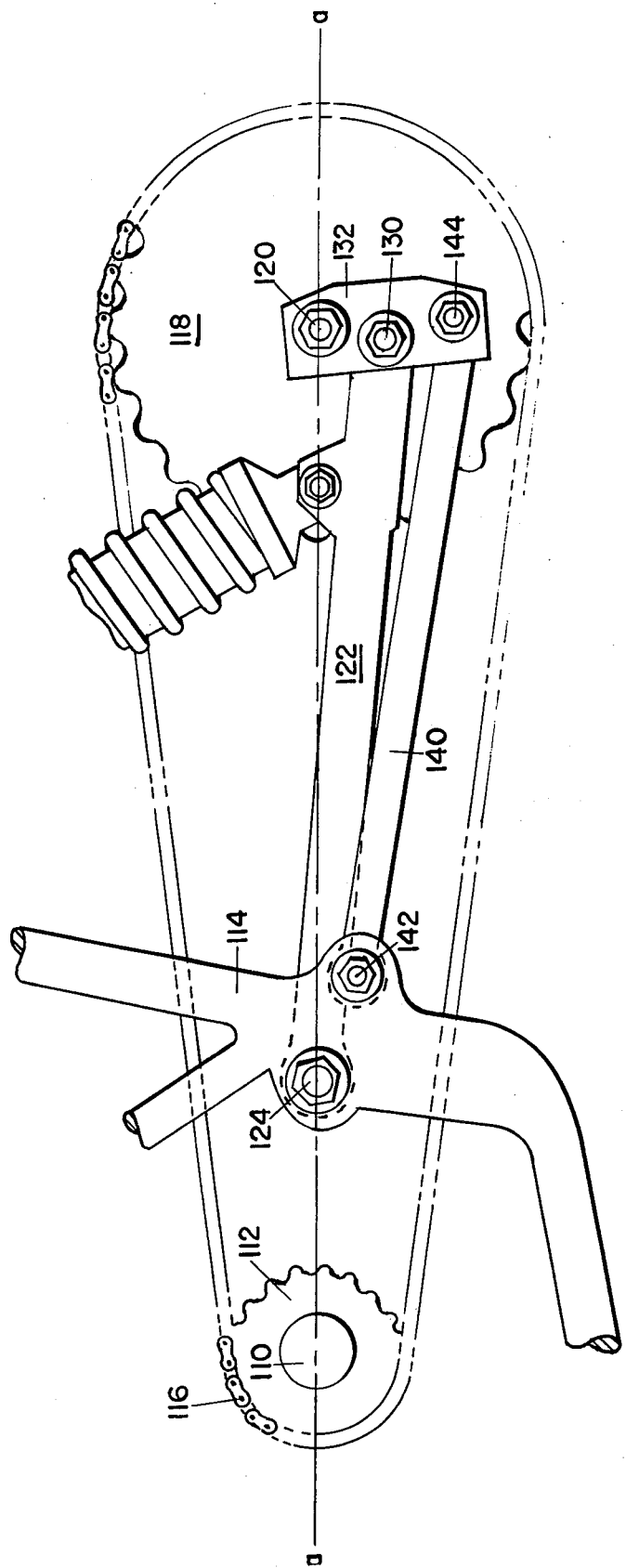
FIG. 2 is a view similar to FIG. 1 showing the mechanism of the invention.

In the FIG. 1 exemplification of the usual motorcycle suspension system, there is shown a transmission or counter shaft 10, a front or driving or transmission sprocket 12 operatively connected to and turning with counter shaft 10. The frame is represented by 14, only a broken part of same being shown. Driving sprocket 12 carries a driving chain 16 which is also entrained around a rear wheel or driven sprocket 18 for driving the rear wheel, only the rear axle shaft 20 of which is illustrated.

Frame 14 mounts at a forward swing-arm pivot 24 the forward extremity of a swing-arm 22, the rearward extremity of such swing-arm being mounted on rear axle shaft 20.

Under normal operating conditions, the straight-line situation obtains wherein the driving sprocket/counter shaft center, forward swing-arm pivot, and rear axle shaft center are disposed in a straight line axis denoted as $a$—$a$. Let it be here explained that the rear axle shaft center is not illustrated as being along that straight line axis in the FIG. 1 showing; same has been shown as swung in an arc below its intersection with straight line $a$—$a$ in order best to illustrate its sweep through the arc $c$—$c$ as determined by its pivot, forward swing-arm pivot 24.

In the normal straight-line axis situation, the driving chain is most tight. It is normal, in terms of driving chain adjustment, to load the machine to the desired degree of tension when the elements are so straight-line disposed, same being representative of the normal condition.

Operationally, the suspension system reacts to encountered highway or travel path roughness in a manner where the rear wheel is driven in a vertical plane along the arc or path of suspension travel $b$—$b$ on both sides of, (that is above and below the straight-line axis $a$—$a$), the arc as determined by the swing of swing-arm 22 on its forward swing-arm pivot 24.

At the extremes of suspension travel at the uppermost and lowermost ends of arc $b$—$b$, the chain will be understood to have its greatest degree of slack, the distance between the sprocket centers being observed to be represented by a distance $c$ in the straight-line situation and being represented by a distance less than $c$ when the sprocket is disposed thereabove or therebelow.

Rear suspension systems of the prior art thus suffer from the complaint that the arc travel of the rear wheel results in a variance of the drive chain tension.

In the FIGS. 2 -5 exemplification, the gear train or linkage is shown between the engine and the rear or driving wheel, neither of which components are per se illustrated for the sake of simplicity.

A front or driving sprocket 112 takes off from the engine shaft 110 in known manner and mounts a driving chain 116 which is also entrained around a driven sprocket 118 mounted on a rear axle shaft 120, upon which shaft a trunnion 132 is also mounted.

The vehicle frame is denoted in broken form by 114. Same pivotally mounts, at a forward swing-arm pivot 124, the forward extremity of a swing-arm 122, the rearward extremity of such swing-arm being pivotally mounted at a rearward swing-arm pivot 130 on trunnion 132 below rear axle shaft 120.

A compensating lever 140 is mounted at a forward compensating lever pivot 142 on the frame and the rearward extremity of such compensating lever is pivotally mounted at a rearward compensating lever pivot 144 on trunnion 132 below rearward swing-arm pivot 130. The compensating lever is desirably provided with an offset along its length so as to allow for the crisscrossing thereof with swing-arm 122 in certain of its assumed positions.

It is to be noted that the centers of rear axle shaft 120, rearward swing-arm pivot 130, and rearward compensating lever pivot 144 are not along a common center line with respect to the vertical axis of trunnion 132, and this is for the reason that the geometry of the situation precludes same as the mechanism is put into operational use.

In the normal FIG. 3 straight-line situation, the driving sprocket/counter shaft center represented by 110, the forward swing-arm pivot represented by 124, and the rear axle shaft center represented by 120, are disposed along straight-line axis $a-a$ with forward compensating lever pivot 142 on the frame being disposed rearwardly of forward swing-arm pivot 124 and below straight-line axis $a-a$.

Figure 4:
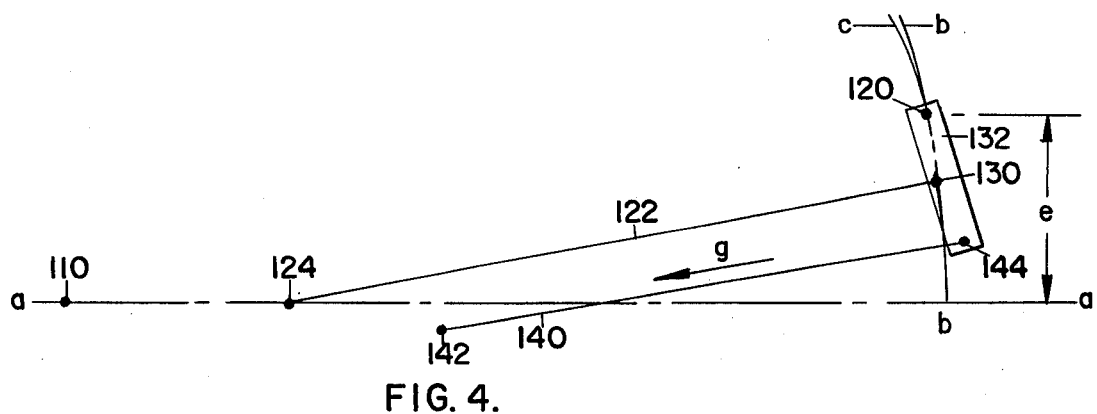

When a bump is encountered, the rear wheel is driven upwardly along arc $b-b$ as determined by swing-arm 122 swingable on forward swing-arm pivot 124 through a distance upwardly of the straight-line center-line $a-a$, that distance being denoted by letter $e$ in FIG. 4.

Figure 3:
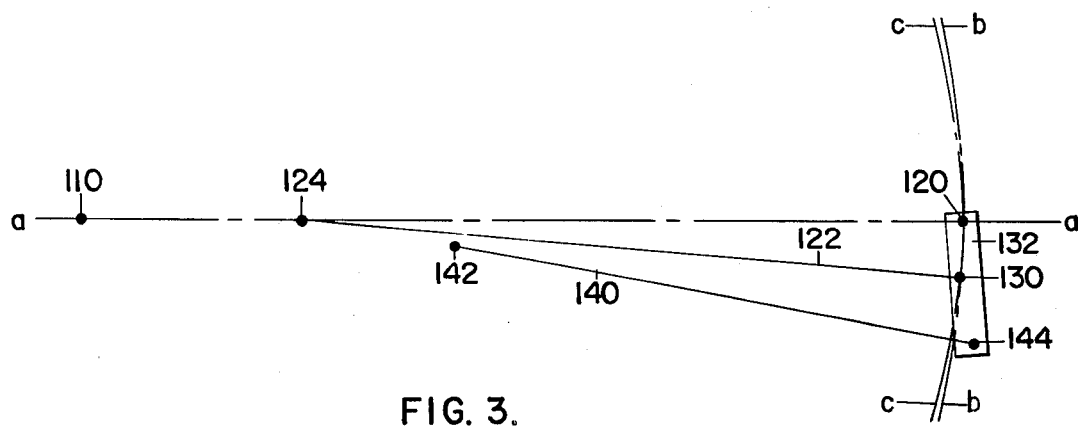
FIGS. 3 – 5 are schematic views showing the relationship of the components of the mechanism in the normal operating position, in the rear wheel vertically upward position, and in the rear wheel vertically downward position respectively.

In such instance, the center-to-center distance between driving sprocket/counter shaft center 110 and rear axle shaft center 120 is seen to be the same as and disposed along the same arc $b-b$ as it was along straight-line center-line $a-a$ due to the pulling force of compensating lever 140 tending to pull the lower end of trunnion 132 inwardly, in the direction of arrow $g$, as the rear wheel is jounced from the FIG. 3 to the FIG. 4 position, and thereby urging rear axle shaft 120 into a position of continued coincidence with and on arc $b-b$.

That is, the rear wheel is permitted to rise or fall through a considerable range of movement without changing its band distance from the engine driving shaft, the rear wheel axle rising or falling in the arc which is concentric relative to the shaft of the engine thereby maintaining an unvarying tension of the chain.

Figure 5:
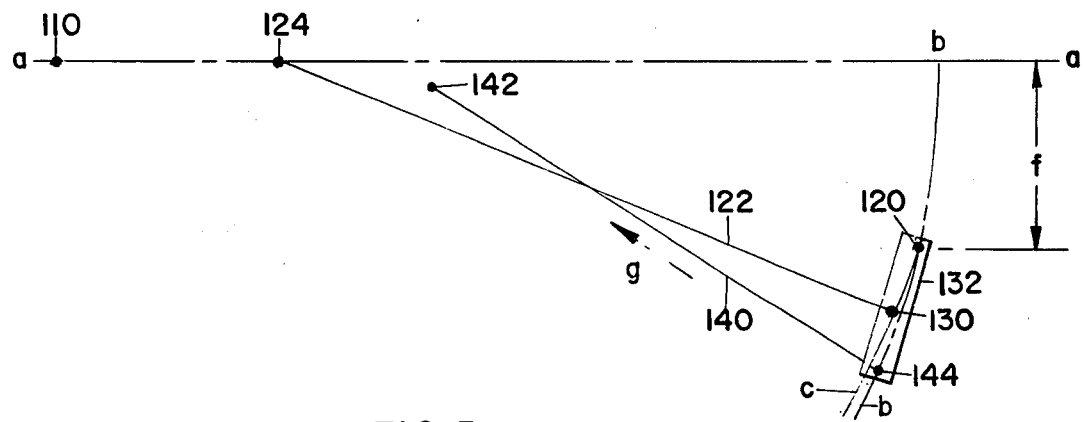

There the center-to-center distance between driving sprocket/counter shaft center 110 and rear axle shaft center 120 is seen to be the same as and disposed along the same arc $b-b$ as it was along straight-line centerline $a-a$, here again due to the pulling action of compensating lever 140 pulling the lower end of trunnion 132 inwardly, in the direction of arrow $a$, as the rear wheel is jounced from the FIG. 3 to the FIG. 5 position, and thereby pushing rear axle shaft 120 into a fixed position of continual coincidence with and on the arc $b-b$.

I claim:

1. In a motorcycle having an engine mounted on a frame and a transmission sprocket and a rear wheel and axle and a rear wheel sprocket and driving chain, an improved suspension system including:
   a trunnion rotatably mounted on the rear wheel axle,
   a swing arm pivotally mounted to each of the frame and trunnion,
   a compensating lever pivotally mounted to each of the frame and on the trunnion,
   means for guiding vertical movement of the rear wheel by effecting a pulling force upon the lower portion of the trunnion in an inboard direction toward the pivotal connection of the compensating lever and the frame with a resultant coincidence of the rear wheel axle in its traverse of a predetermined arc in coincidence with the arc of travel of the pivotal connection of the swing arm and trunnion.

2. In a motorcycle including an engine mounted on a frame and a transmission sprocket and a rear wheel and axle therefor and a rear wheel sprocket and driving chain, the improvement in a suspension system comprising:
   a trunnion mounted on the rear wheel axle,
   a swing arm pivotally disposed between the frame at its forward extremity and the trunnion at its rearward extremity,
   a compensating lever pivotally disposed between the frame at its forward extremity and the trunnion at its rearward extremity, and
   means for guiding vertical movement of the rear wheel along a predetermined arc as controlled by the rocking movement of the trunnion upon its pivotal connection with the swing arm responsively to the forces generated upon the trunnion by the shifting movements of the compensating lever.

3. In a motorcycle having an engine mounted on a frame between a front wheel and a rear wheel and a transmission sprocket and a rear wheel sprocket and driving chain, an improved suspension system including:
   a trunnion journalled on the rear wheel axle,
   a swing arm pivotally mounted on the frame and on the trunnion,
   a compensating lever pivotally mounted on the frame and on the trunnion,
   means for permitting vertical swinging movement of the rear wheel as determined by the swing arms only responsively to the turning of the trunnion around the pivotal mounting of the swing arm for pulling one portion inwardly and pushing its other portion outwardly along a position of continued coincidence with the arc.

* * * * *